(12) United States Patent (10) Patent No.: US 8,255,066 B2
Boiko et al. (45) Date of Patent: Aug. 28, 2012

(54) METHOD AND APPARATUS FOR TUNING A PID CONTROLLER

(75) Inventors: Igor Boiko, Calgary (CA); Mikhail Boiko, Calgary (CA); Natalia Boiko, Calgary (CA); Alexander Boiko, Calgary (CA)

(73) Assignee: IMB Controls Inc., Calgary (CA)

( * ) Notice: Subject to any disclaimer, the term of this patent is extended or adjusted under 35 U.S.C. 154(b) by 265 days.

(21) Appl. No.: 12/780,822

(22) Filed: May 14, 2010

(65) Prior Publication Data
US 2010/0292813 A1 Nov. 18, 2010

Related U.S. Application Data

(60) Provisional application No. 61/179,339, filed on May 18, 2009.

(51) Int. Cl.
*G05B 13/02* (2006.01)
(52) U.S. Cl. ............... 700/42; 700/28; 700/30; 700/37; 700/44; 18/609; 18/610
(58) Field of Classification Search .............. 700/28–31, 700/37, 41–45; 318/609–610
See application file for complete search history.

(56) References Cited

U.S. PATENT DOCUMENTS

| | | | | |
|---|---|---|---|---|
| 4,754,391 A * | 6/1988 | Suzuki | | 700/37 |
| 5,568,377 A * | 10/1996 | Seem et al. | | 700/37 |
| 6,055,524 A * | 4/2000 | Cheng | | 706/23 |
| 6,697,767 B2 * | 2/2004 | Wang et al. | | 702/189 |
| 6,847,851 B1 * | 1/2005 | Keane et al. | | 700/42 |
| 7,024,254 B2 * | 4/2006 | Salsbury et al. | | 700/55 |
| 7,035,695 B2 * | 4/2006 | Boiko | | 700/28 |
| 7,606,624 B2 * | 10/2009 | Cullen | | 700/29 |
| 7,809,668 B1 * | 10/2010 | Smith et al. | | 706/47 |
| 2002/0111758 A1 * | 8/2002 | Wang et al. | | 702/79 |
| 2003/0153990 A1 * | 8/2003 | Boiko | | 700/37 |
| 2009/0198386 A1 * | 8/2009 | Kim et al. | | 700/298 |

OTHER PUBLICATIONS

"Application of the Locus of a Perrurbed Relay System to Sliding Mode Relay Control Design" by Boiko et I., IEEE, Sep. 2000, pp. 542-547.*
"Application of the Locus of a Perturbed Relay System to Analysis and Design of Relay Servo Systems with Nonlinear Plants" by Boiko et al., AACC, Pates 1527-1532, Jun. 2001.*
"Automatic Identification Via the Locus of a Perturbed Relay System Approach" by Boiko et al., IEEE, Jun. 2003, pp. 4385-4390.*
"Modified Relay Feedback Test and its use for Non-parametric Loop Tuning" by Boiko, IEEE, Jun. 2008, pp. 4755-4760.*
"Performance Amnalysis and Tunig of Variables-Structure PID Controllers for Level Process", by Bioko et al., IEEE, Jul. 2009, pp. 268-273.*

* cited by examiner

*Primary Examiner* — Ramesh Patel (57) ABSTRACT

In tuning a PID controller for a process in a feedback control system, a method is provided for bringing the system into symmetric self-excited oscillations for measuring the frequency and the amplitude of the oscillations, and tuning the controller in dependence on the measurements obtained. A control algorithm referred to as the modified relay feedback test is introduced into a system in series with a process to generate self-excited oscillations. Tuning includes the steps of selecting a desired gain margin or phase margin, generating oscillations with the algorithm parameter corresponding to a selected gain or phase margin, measurements of the amplitude and the frequency of these oscillations, and computing PID controller tuning parameters. Data and formulas are given for the computation of the specific parameter of the modified relay feedback test and for tuning the parameters of the PID controller. An apparatus for performing the method is disclosed.

10 Claims, 7 Drawing Sheets

METHOD AND APPARATUS FOR TUNING A PID CONTROLLER

CROSS-REFERENCE TO RELATED APPLICATIONS

U.S. Patent Documents:

| | | | |
|---|---|---|---|
| 4,214,300 | July, 1980 | Barlow et al. | 364/105. |
| 4,549,123 | October, 1985 | Hagglund et al. | 364/157. |
| 4,602,326 | July, 1986 | Kraus | 364/158. |
| 4,754,391 | June, 1988 | Suzuki | 364/157. |
| 4,836,319 | June, 1989 | Haseda et al. | 180/142. |
| Re33267 | July, 1990 | Kraus | 364/158. |
| 5,124,626 | June, 1992 | Thoen | 364/161. |
| 5,222,022 | June, 1993 | Adams et al. | 364/431. |
| 5,223,778 | June, 1993 | Svarovsky et al. | 364/157. |
| 5,229,699 | July, 1993 | Chu et al. | 364/162. |
| 5,283,729 | February, 1994 | Lloyd | 364/157. |
| 5,311,421 | May, 1994 | Nomura et al. | 364/157. |
| 5,325,288 | June, 1994 | Satou | 364/162. |
| 5,396,415 | March, 1995 | Konar et al. | 364/162. |
| 5,412,557 | May, 1995 | Lauw | 363/37. |
| 5,453,925 | September, 1995 | Wojsznis et al. | 364/157. |
| 5,535,117 | July, 1996 | Hiroi | 364/158. |
| 5,568,377 | October, 1996 | Seem et al. | 364/157. |
| 5,587,899 | December, 1996 | Ho et al. | 364/157. |
| 5,587,896 | December, 1996 | Hansen et al. | 700/28 |
| 5,742,503 | April, 1998 | Yu | 700/42 |
| 7,035,695 | April, 2006 | Boiko | 700/28 |
| 7,249,882 | July, 2007 | Lin | 374/101 |

Other References

Cheng et al., 1999, Identification and Control of Nonlinear Systems Using Multiple Models: Relay Feedback Approach. Proc. American Control Conference 1999, 3327-3331.

Chiang et al., 1992, Derivation of Transfer Function from Relay Feedback Systems. Ind. Eng. Chem. Res. 31, 855-860.

I. Boiko, Discontinuous Control Systems: Frequency-Domain Analysis and Design, Boston, Birkhauser, 212 p., 2009.

STATEMENT REGARDING FEDERALLY SPONSORED RESEARCH OR DEVELOPMENT

Not Applicable

Reference to Sequence Listing, a Table, or a Computer Program Listing Compact Disk Appendix Not Applicable

BACKGROUND OF THE INVENTION

Despite the apparent success of advanced process control, the proportional-integral-derivative (PID) control still remains the main type of control in the process industries. PID controllers and their variations such as proportional-integral (PI), proportional-derivative (PD), and proportional (P) controllers are implemented as either stand-alone controllers or configurable software modules within the distributed control systems (DCS). The DCS software is constantly evolving providing a number of new features, among which the controller autotuning functionality is one of most useful.

Tuning of PID controllers based on relay feedback tests proposed by Astrom and Hagglund in 1981 (respective U.S. Pat. No. 4,549,123 issued in 1985) received a lot of attention after that (W. L. Luyben, "Derivation of Transfer Functions for Highly Nonlinear Distillation Columns", Ind. Eng. Chem. Res. 26, 1987, pp. 2490-2495; Tore Hagglund, Karl J. Astrom, "Industrial Adaptive Controllers Based on Frequency Response Techniques", Automatica 27, 1991, pp. 599-609). It identifies the important dynamic information, ultimate gain and ultimate frequency, in a straightforward manner. The success of this type of tuners lies on the fact that they are simple and reliable. These features of the relay feedback autotuning have lead to a number of commercial tuners (Tore Hagglund, Karl J. Astrom, "Industrial Adaptive Controllers Based on Frequency Response Techniques", Automatica 27, 1991, pp. 599-609) and industrial applications (H. S. Papastathopoulou, W. L. Luyben, "Tuning Controllers on Distillation Columns with the Distillate-Bottoms Structure", Ind. Eng. Chem. Res. 29, 1990, pp. 1859-1868).

Despite the apparent success of relay based tuning, it can lead to reduced or vice versa excessively large gain and phase margins because of the choice of the test point (frequency of the oscillations) corresponding to the phase lag of the process equal to $-180°$ (phase cross-over frequency $\omega_\pi$) while inclusion of the controller in the loop introduces additional phase shift, which was not accounted for at the selection of the test point and designing the tuning rules.

BRIEF SUMMARY OF THE INVENTION

The present invention completely eliminates this source of inaccuracy via the selection of a different test point, development of the test for excitation of oscillation in the selected test point, and designing the tuning rules that account for the phase shift due to the controller introduction. Therefore, the proposed test and tuning rules ensure that either the specified gain margin of the system or the specified phase margin of the system will be provided. The present invention defines a method and an apparatus for bringing the system (comprising the process, and the developed control algorithm) into symmetric oscillations (further referred to as modified relay feedback test) for determining (measuring) quantities essential for the tuning of the controller. The method is based on the measurement of the frequency and the amplitude of the oscillations in the system under the modified relay feedback test and calculation of the controller tuning parameters in dependence on the measurements obtained. The invention includes all variations and combinations (P, PI, PID, etc.) of the control type of the PID controller.

DETAILED DESCRIPTION OF THE INVENTION

Referring to the drawings, a description will be given of an embodiment of a controller tuning method according to the present invention.

The practice of the use of tuning algorithms shows that simple non-parametric methods (the ones that are not based on any model of the process) such as Ziegler-Nichols's closed-loop tuning method (J. G. Ziegler, and N. B. Nichols, "Optimum settings for automatic controllers", *Trans. Amer. Soc. Mech. Eng.*, Vol. 64, 1942, pp. 759-768) and Astrom-Hagglund's relay feedback test (RFT) (K. J. Astrom and T. Hagglund, "Automatic tuning of simple regulators with specifications on phase and amplitude margins," *Automatica*, 20, 1984, p. 645-651) provide a satisfactory and consistent performance even in the conditions characterized by the presence of measurement noise and varying disturbances, when deterioration of more sophisticated methods becomes significant. However, the use of only ultimate gain and frequency cannot ensure sufficient accuracy of tuning There is one more factor that contributes to the issue of relatively low precision. This is the fact that the test point in the closed-loop test is selected to be the one in which the phase characteristic of the process is equal to −180° (phase cross-over frequency $\omega_\pi$). This approach does not account for the change of frequency $\omega_\pi$ due to the controller introduction, which is the factor that contributes to the deterioration of tuning accuracy.

The present invention aims to introduce a tuning method in which the above-noted problem of the cross-over frequency shift is compensated for by the respective design of the modified relay feedback test (modified RFT). Respective tuning rules matching to the modified relay feedback test are also proposed that allows for the better accuracy of tuning It has been a popular notion that the most important point on the frequency response of the system is the point where the phase characteristic of the process is equal to −180° (phase cross-over frequency $\omega_\pi$). However, in publication (I. Boiko, "Modified relay feedback test and its use for non-parametric loop tuning" Proc. 2008 American Control Conference, Seattle, Jun. 11-13, 2008, pp. 4755-4760) it was shown that this point remains the most important one only in the system with the proportional controller, when introduction of the controller does not change the value of $\omega_\pi$. This circumstance is often neglected, and the principle is applied to all types of PID control. We consider the following example that shows how the introduction of the controller affects the results of tuning Example 1. We assume that the process is given by the following transfer function (which was used in a number of works as a test process):

$$W_p(s) = e^{-2s} \frac{1}{(2s+1)^5}, \quad (1)$$

We find the first order plus dead time (FOPDT) approximating model $\hat{W}_p(s)$ to the process (1) based on matching the values of the two transfer functions at frequency $\omega_\pi$:

$$\hat{W}_p(s) = \frac{K_p e^{-\tau s}}{T_p s + 1}, \quad (2)$$

where $K_p$ is the process static gain, $T_p$ is the time constant, and $\tau$ is the dead time. Let us apply method (J. G. Ziegler, and N. B. Nichols, "Optimum settings for automatic controllers", *Trans. Amer. Soc. Mech. Eng.*, Vol. 64, 1942, pp. 759-768) to the tuning of process (1) and note that both (1) and (2) should produce the same ultimate gain and ultimate frequency in the Ziegler-Nichols closed-loop test or the same values of the amplitude and the ultimate frequency in the RFT (K. J. Astrom and T. Hagglund, "Automatic tuning of simple regulators with specifications on phase and amplitude margins," *Automatica*, 20, 1984, p. 645-651). This problem has infinite number of solutions, as there are three unknown parameters of (2) and only two measurements obtained from the test. Assume that the value of the process static gain is known: $K_p=1$, and determine $T_p$ and $\tau$. These parameters can be found from the following equation:

$$\hat{W}_p(j\omega_\pi) = W_p(j\omega_\pi),$$

where $\omega_\pi$ is the phase cross-over frequency for both transfer functions. Therefore, arg $W_p(j\omega_\pi) = -\pi$. The value of $\omega_\pi$ is 0.283, which gives $W_p(j\omega_\pi) = (-0.498, j0)$, and the first-order-plus-dead-time (FOPDT) approximation is, therefore, as follows (found via solution of the set of two algebraic equations):

$$\hat{W}_p(s) = \frac{e^{-7.393s}}{6.153s+1}. \quad (3)$$

Figure 1:
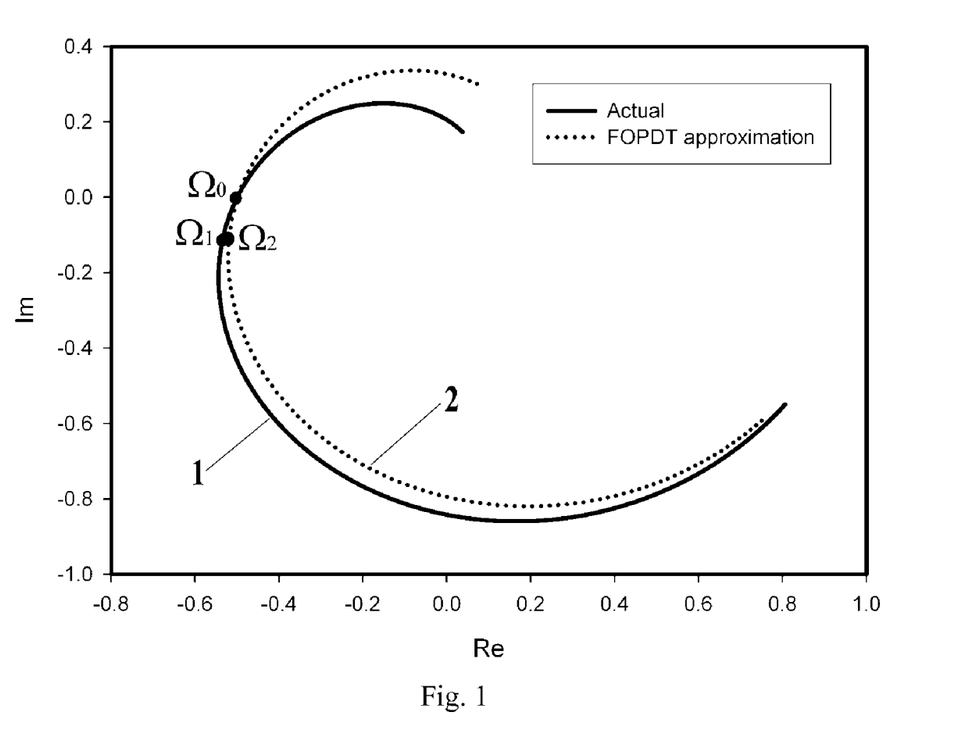
FIG. 1. Nyquist plots for process (1) and first-order-plus-dead-time (FOPDT) approximation (3).

The Nyquist plots of the process 1 given by formula (1) and its approximation 2 given by formula (3) are depicted in FIG. 1. The point of intersection of the two plots (denoted as Ωhd 0) is also the point of intersection with the real axis. Also $\Omega_0 = \omega_\pi$ for both process dynamics (1) and (3), and therefore $\hat{W}_p(j\Omega_0) = W_p(j\omega_0)$. If the designed controller is of proportional type then the gain margins for processes (1) and (3) are the same. However, if the controller is of PI type then the stability margins for (1) and (2) are different. We illustrate that below. We design the PI controller given by the following transfer function:

$$W_c(s) = K_c\left(1 + \frac{1}{T_c s}\right), \quad (4)$$

using the Ziegler-Nichols tuning rules (J. G. Ziegler, and N. B. Nichols, "Optimum settings for automatic controllers", *Trans. Amer. Soc. Mech. Eng.*, Vol. 64, 1942, pp. 759-768). This results in the following transfer function of the controller:

$$W_c(s) = 0.803\left(1 + \frac{1}{17.76s}\right), \quad (5)$$

Figure 2:
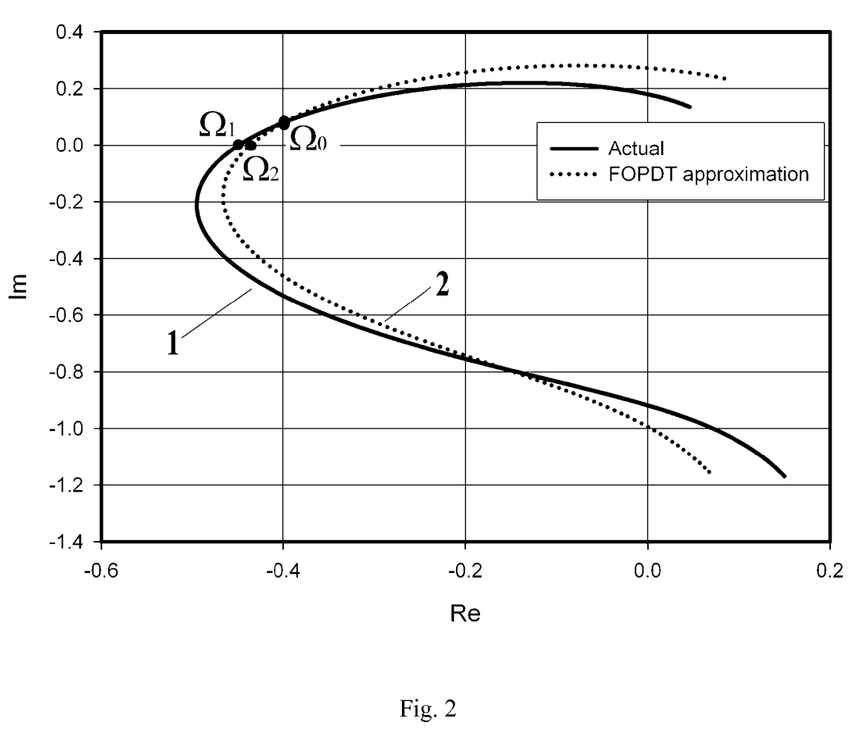
FIG. 2. Nyquist plots for open-loop system with PI controller and process.

The Nyquist plot of the open-loop systems containing the process (1) and the controller (5) denoted as 1 and the Nyquist plot of the open-loop systems containing the process approximation (3) denoted as 2 are depicted in FIG. 2. It follows from the frequency-domain theory of linear systems and the used tuning rules that the mapping of point $\Omega_0$ in FIG. 1 into point $\Omega_0$ in FIG. 2 is done via clockwise rotation of vector $\vec{W}_p(j\Omega_0)$ by the angle $\psi = \arctan(1/(0.8\cdot 2\pi)) = 11.25°$ and multiplication of its length by such value, so that its length becomes equal to 0.408. However, for the open-loop system containing the PI controller, the points of intersection of the Nyquist plots of the system and of the real axis are different for the system with process (1) and with process approximation (3). They are shown as points $\Omega_1$ and $\Omega_2$ in FIG. 2. The mapping of these points to the Nyquist plots of the process and its approximation is shown in FIG. 1. Therefore, the stability margins of the systems containing a PI controller are not the same any more. It is revealed as different points of intersection of the plots and of the real axis in FIG. 2. In fact, the position of vector $\vec{W}_{ol}(j\Omega_0)=\vec{W}_c(j\Omega_0)\vec{W}_p(j\Omega_0)$ is fixed, but this vector does not reflect the stability of the system. As one can see in FIG. 2, the gain margin of the system containing the FOPDT approximation of the process is higher than the one of the system with the original process. The considered example illustrates the drawback of methods of tuning based on the measurements of process response in the critical point $\Omega_0$. This drawback is because of the shift of the critical point due to the introduction of the controller.

The present invention aims to eliminate the noted drawback by generating oscillations in the critical point that is not necessarily located on the real axis but in the point $\Omega_0$, which would correspond to certain desired phase lag of the process, so that the introduction of the controller is accounted for in the test itself.

It is proposed that the modified RFT should be designed as the following control:

$$u(t) = \begin{cases} h & \text{if } \sigma(t) \geq \Delta_1 \text{ or } (\sigma(t) > -\Delta_2 \text{ and } u(t-) = h) \\ -h & \text{if } \sigma(t) \leq \Delta_2 \text{ or } (\sigma(t) < \Delta_1 \text{ and } u(t-) = -h) \end{cases} \quad (6)$$

where $\Delta_1=\beta\sigma_{max}$, $\Delta_2=-\beta\sigma_{min}$, $\sigma_{max}$ and $\sigma_{min}$ are last "singular" points of the error signal 2 (FIG. 3) corresponding to the last maximum and minimum values of $\sigma(t)$ after crossing the zero level, $\beta$ is a positive constant.

Assume that the reference signal r(t) 1 in the system containing the process 6, the control algorithm (modified RFT) 5, and the summer 7 (FIG. 3), is zero and show that in the steady mode, the motions of the control 3 provided by the algorithm 5 given by (6) and of the output 4 are periodic. Apply the describing function (DF) method (Derek P. Atherton, "Nonlinear Control Engineering", Van Nostrand Reinhod New York, 1982) to the analysis of motions in FIG. 3. Assume that the steady mode periodic, and show that this is a valid assumption by finding parameters of this periodic motion (Note: a rigorous proof is presented in the article I. Boiko, L. Fridman, I. M. Castellanos, "Analysis of second-order sliding mode algorithms in the frequency domain," IEEE Trans. Automat. Contr., Vol. 49, No. 6, pp. 946-950, 2004). If the motions in the system are periodic then $\sigma_{max}$ and $\sigma_{min}$ represent the amplitude of the oscillations: $\alpha_0=\sigma_{max}=-\sigma_{min}$, and the equivalent hysteresis value of the relay is $\Delta=\Delta_1=\Delta_2=\beta\sigma_{max}=-\beta\sigma_{min}$. The DF of the hysteretic relay is given as the following function of amplitude $\alpha$:

$$N(a) = \frac{4h}{\pi a}\sqrt{1-\left(\frac{\Delta}{a}\right)^2} - j\frac{4h\Delta}{\pi a^2}, \quad a > \Delta \quad (7)$$

Figure 3:
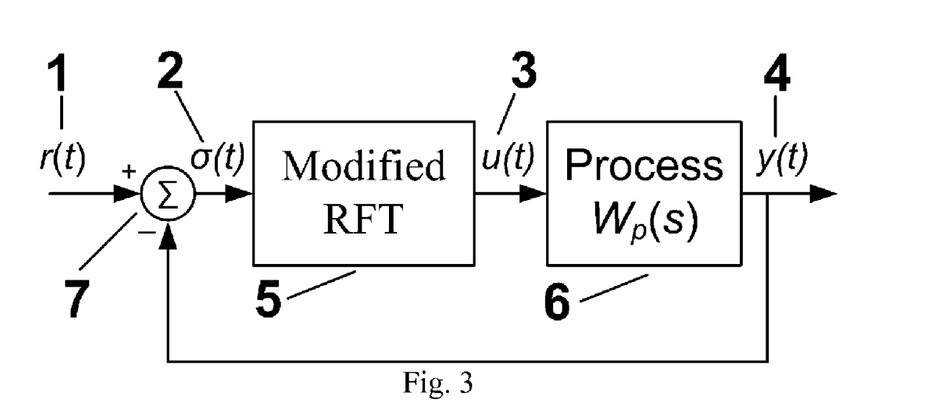
FIG. 3. Modified relay feedback test.

However, the system FIG. 3 with control (6) is not a conventional relay system. This system has the hysteresis value that is unknown a-priori and depends on the amplitude value: $\Delta=\beta\alpha$. Therefore, (7) can be rewritten as follows:

$$N(a) = \frac{4h}{\pi a}(\sqrt{1-\beta^2} - j\beta), \quad (8)$$

The modified RFT will generate oscillations in the system under control (6). Parameters of the oscillations can be found from the harmonic balance equation:

$$W_p(j\Omega_0) = -\frac{1}{N(a_0)}, \quad (9)$$

where $\alpha_0$ and $\Omega_0$ are the amplitude and the frequency of the periodic motions. The negative reciprocal of the DF is given as follows:

$$-\frac{1}{N(a)} = -\frac{\pi a}{4h}(\sqrt{1-\beta^2} + j\beta) \quad (10)$$

Figure 4:
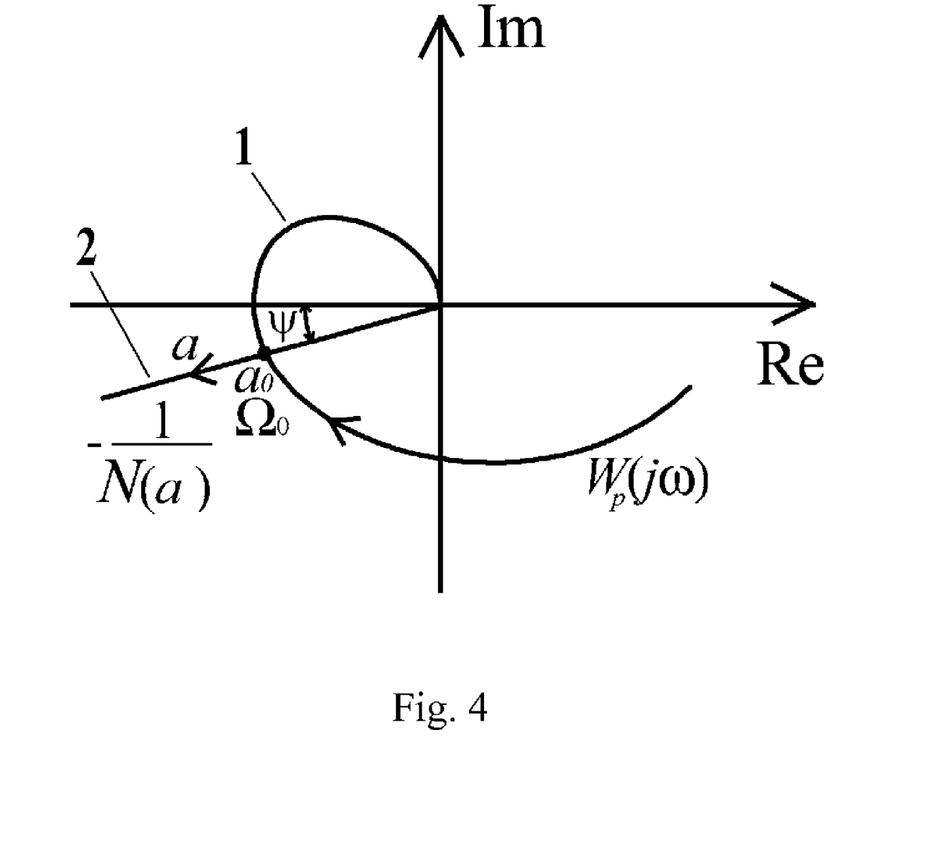
FIG. 4. Finding periodic solution.

Finding a periodic solution in system FIG. 3 with control (6) has a simple graphic interpretation (FIG. 4) as finding the point of intersection of the Nyquist plot of the process 1 and of the negative reciprocal of the DF 2, which is a straight line that begins in the origin and makes a counterclockwise angle $\psi=\arcsin\beta$ with the negative part of the real axis. In the problem of analysis, frequency $\Omega_0$ and amplitude $\alpha_0$ are unknown variables and are found from the complex equation (9). In the problems of tuning, $\Omega_0$ and $\alpha_0$ are measured from the modified RFT, and on the basis of the measurements obtained the tuning parameters are calculated from $\Omega_0$ and $\alpha_0$.

The modified RFT allows for the exact design of the gain margin. Since the amplitude of the oscillations $\alpha_0$ is measured from the test, the process gain at frequency $\Omega_0$ can be obtained as follows:

$$|W_p(j\Omega_0)| = \frac{\pi a_0}{4h}, \quad (11)$$

which after introduction of the controller will become the process gain at the critical frequency.

The PID controller transfer function is $$W_c(s) = K_c\left(1 + \frac{1}{T_{ic}s} + T_{dc}s\right).$$

The tuning rules for a PID controller are then defined as follows:

$$K_c = c_1\frac{4h}{\pi a_0}, \quad T_{ic} = c_2\frac{2\pi}{\Omega_0}, \quad T_{dc} = c_3\frac{2\pi}{\Omega_0}, \quad (12)$$

where $c_1$, $c_2$, and $c_3$ are constant parameters that define the tuning rule. It can be noted that if the tuning rules are assigned as (12) then the closed-loop system characteristics become invariant to the time constants of the process, so that if all time constants of the process were increased by the factor $\alpha$ then the critical frequency would decrease by the same factor $\alpha$, and the product of every time constant by the critical frequency would remain unchanged. If the tuning rules (12) are used then the frequency response of the PID controller at $\Omega_0$ becomes $$W_c(j\Omega_0) = c_1\frac{4h}{\pi a_0}\left(1 - j\frac{1}{2\pi c_2} + j2\pi c_3\right), \quad (13)$$

so that if the tuning rules are established through the choice of parameters $c_1$, $c_2$, and $c_3$, and the test provides oscillations of the frequency $\Omega_u$ which is equal to the phase cross-over frequency $\omega_\pi$ of the open-loop system (including the controller), then the controller phase lag at the frequency $\omega_\pi = \Omega_u$ is constant and depends only on the values of $c_2$, and $c_3$:

$$\varphi_c(\omega_\pi) = \arctan\left(c_3 T_u \Omega_u - \frac{1}{c_2 T_u \Omega_u}\right) \quad (14)$$

$$= \arctan\left(2\pi c_3 - \frac{1}{2\pi c_2}\right)$$

Tuning Rules for Specification on Gain Margin.

Let the specified gain margin be $\gamma_m > 1$ (in absolute values). Then taking absolute values of both sides of (13) and considering (11) we obtain the following equation:

$$\gamma_m c_1 \sqrt{1 + \left(2\pi c_3 - \frac{1}{2\pi c_2}\right)^2} = 1, \quad (15)$$

which is a constraint complementary to the tuning rules (11). To provide the specified gain margin, the modified RFT must be carried out with parameter $$\beta = -\sin\varphi_c \Omega_0 \quad (16)$$

$$= -\sin \arctan\left(2\pi c_3 - \frac{1}{2\pi c_2}\right)$$

In the example considered above, if we keep parameter $c_2$ the same as in Ziegler-Nichols tuning rules (J. G. Ziegler, and N. B. Nichols, "Optimum settings for automatic controllers", Trans. Amer. Soc. Mech. Eng., Vol. 64, 1942, pp. 759-768): $c_2 = 0.8$, then to obtain, for example, gain margin $\gamma_m = 2$ the tuning parameter $c_1$ for the modified RFT should be selected as $c_1 = 0.49$, and parameter)$\beta$ for the test should be selected in a with (16) as)$\beta = 0.195$. For any process, the system will have gain margin $\gamma_m = 2$ (6 dB). Therefore, the modified RFT with parameter)$\beta$ calculated as (16) and tuning rules (12) satisfying the constraint (15) can ensure the desired gain margin. However, (15) is an equation containing three unknown variables, which gives one a freedom to vary parameters $c_1$, $c_2$, and $c_3$. Some optimal sets of tuning rule parameters $c_1$, $c_2$, and $c_3$ (for gain margin $\gamma_m = 2$) that were obtained via simulations, along with the values of $\phi_c(\Omega_o)$ and parameter)$\beta$ for the test, are given in Table 1. One should note the difference between the values of the critical frequency of the conventional RFT and the frequency of oscillations in the modified RFT (except for the proportional controller). Therefore, even if the coefficients $c_2$, $c_3$ of Table 1 have the same values as corresponding coefficients of Ziegler-Nichols tuning rules (J. G. Ziegler, and N. B. Nichols, "Optimum settings for automatic controllers", Trans. Amer. Soc. Mech. Eng., Vol. 64, 1942, pp. 759-768), they will actually produce different values of controller parameters $T_{ic}$ and $T_{dc}$. In fact, due to the negative value of $\phi_c(\Omega_0)$ for the PI controller (and consequently, lower frequency of oscillations of the modified RFT), one would get higher value of $T_{ic}$ computed through the modified RFT and data of Table 1. And vice versa, due to the positive value of $\phi_c(\Omega_0)$ for the PID controller, one would get lower values of $T_{ic}$ and $T_{dc}$, computed through the modified RFT and data of Table 1.

TABLE 1

Tuning rules for gain margin $\gamma_m = 2$

| Controller | $c_1$ | $c_2$ | $c_3$ | $\phi_c(\Omega_0)$ | $\beta$ |
|---|---|---|---|---|---|
| P | 0.50 | 0 | 0 | 0 | 0 |
| PI | 0.49 | 0.80 | 0 | −11.2° | 0.195 |
| PID | 0.46 | 0.50 | 0.12 | 23.5° | −0.399 |

Tuning Rules for Specification on Phase Margin.

The relationship that would allow one to tune PID controllers with specification on phase margin for the open-loop system can also be derived. Using the same format of the tuning rules (12), and considering that if the parameter $\beta$ of the modified RFT is calculated from the sum of $\phi_c(\Omega_0)$ and the phase margin $\phi_m$ as:

$$\beta = \sin(\phi_m - \varphi_c(\Omega_0)) \quad (17)$$

$$= \sin\left(\phi_m + \arctan\left(\frac{1}{2\pi c_2} - 2\pi c_3\right)\right),$$

we formulate the constraint for the tuning rules ensuring $\phi_m$ as follows:

$$c_1 \sqrt{1 + \left(2\pi c_3 - \frac{1}{2\pi c_2}\right)^2} = 1. \quad (18)$$

Figure 5:
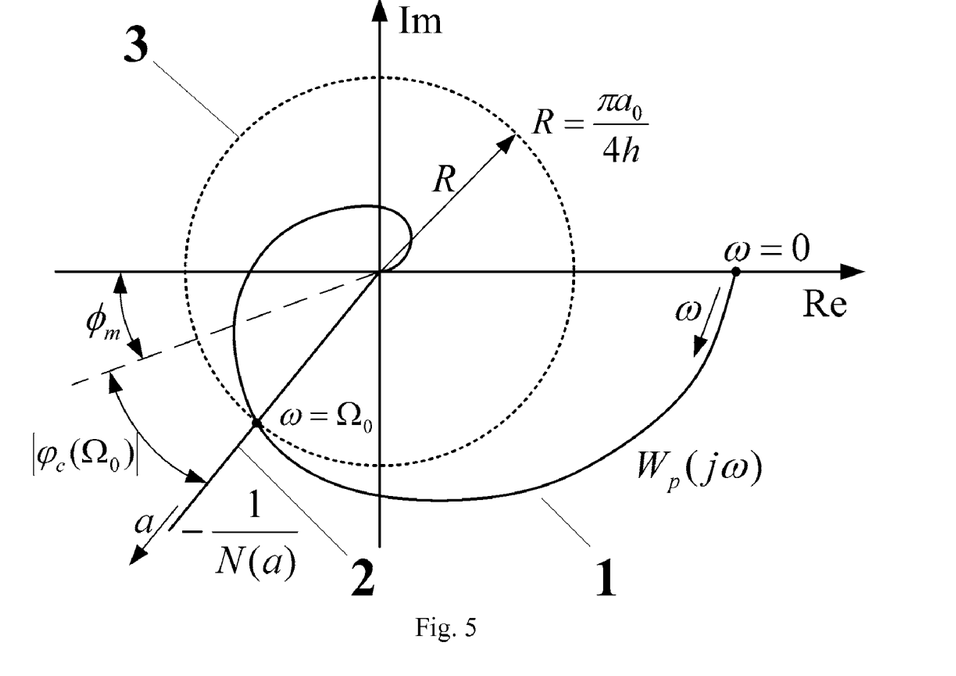
FIG. 5. Modified RFT and tuning with specification on phase margin.

The graphical interpretation of modified RFT and tuning with specification on phase margin are presented in FIG. 5, where the Nyquist plot of the process 5 intersects with the negative reciprocal of the DF of the modified RFT 2 in the point that defines the circle of radius $$R = \frac{\pi a_0}{4h} 3.$$

TABLE 2

Tuning rules for phase margin $\phi_m = 45°$

| Controller | $c_1$ | $c_2$ | $c_3$ | $\phi_c(\Omega_0)$ | $\beta$ |
|---|---|---|---|---|---|
| P | 1.0 | 0 | 0 | 0° | 0.707 |
| PI | 0.98 | 0.80 | 0 | −11.2° | 0.831 |
| PID | 0.92 | 0.50 | 0.12 | 23.5° | 0.367 |

Therefore, if tuning rules (12) are subject to constraint (18) then at frequency $\Omega_0$ of the modified RFT: (a) the absolute value of the open-loop frequency response, in accordance with (11), (13), is $$|W_{ol}(j\Omega_0)| = |W_c(j\Omega_0)||W_p(j\Omega_0)|$$

$$= \frac{\pi a}{4h} c_1 \frac{4h}{\pi a} \sqrt{1 + \left(2\pi c_3 - \frac{1}{2\pi c_2}\right)^2}$$

$$= c_1 \sqrt{1 + \left(2\pi c_3 - \frac{1}{2\pi c_2}\right)^2} = 1,$$

that constitutes the magnitude cross-over frequency, and (b) the phase of the open-loop frequency response is $$\arg W_{ol}(j\Omega_0) = \arg W_c(j\Omega_0) + \arg W_p(j\Omega_0) = -180° + (\phi_m - \phi_c(\Omega_0)) + \phi_c(\Omega_0) = -180° + \phi_m,$$

which shows that the specification on the phase margin is satisfied. Assuming that the controller at frequency $\Omega_0$ of the modified RFT should provide the same phase response as at critical frequency of the conventional RFT, we can obtain the following values of parameters $c_1$, $c_2$, $c_3$ (see Table 2 for $\phi_m = 45°$. Like in the tuning with specification on gain margin, one should note the difference between the values of the critical frequency of the conventional RFT and the frequency of oscillations in the modified RFT, which will result in different values of the controller parameters. The proposed method of tuning is illustrated by the following example.

Example 2

Figure 6:
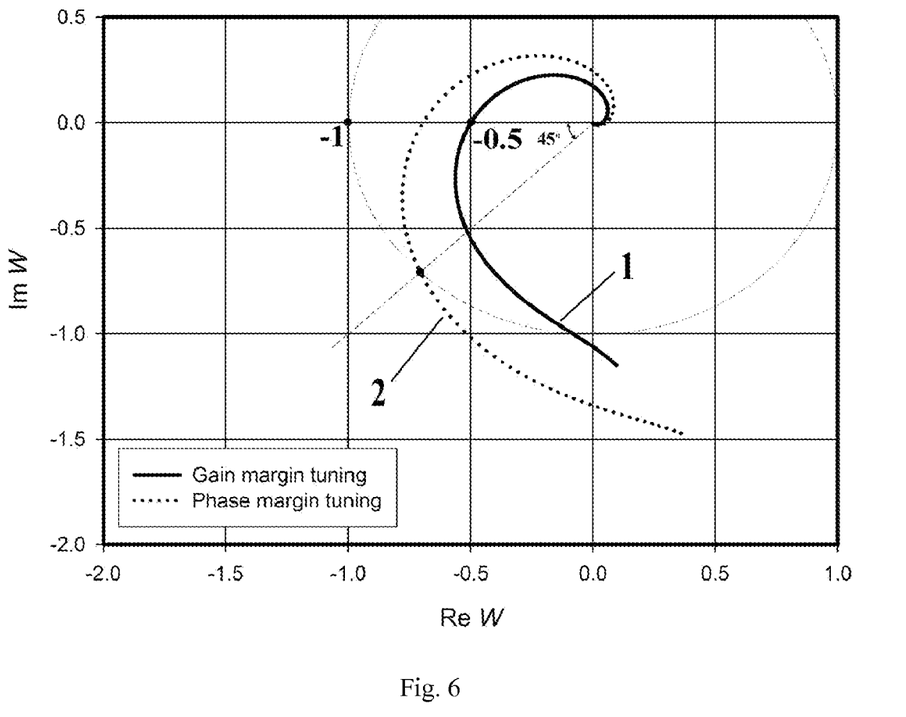
FIG. 6. Nyquist plots of open-loop systems for Example 2.

Consider the process transfer function (1) that was used in Example 1. (a) Apply the modified RFT with amplitude h=1, parameter)β=0.195 and $c_1$, $c_2$ values from Table 1 for tuning a PI controller with specification on gain margin $\gamma_m = 2$. (b) After that use the modified RFT with amplitude h=1, parameter)β=0.659 and $c_1$, $c_2$ values from Table 2 for tuning a PI controller with specification on phase margin $\phi_m = 45°$. The controller tuning that is done according to the presented method produces the following results. (a) The modified RFT gives $\Omega_0 = 0.188$ and $\alpha_0 = 0.393$; for tuning with specification on gain margin the controller parameters calculated per (12) are $K_c = 0.978$, $T_{ic} = 26.74$; (b) The modified RFT gives $\Omega_0 = 0.133$ and $\alpha_0 = 0.544$; for tuning with specification on gain margin the controller parameters calculated per (12) are $K_c = 1.416$, $T_{ic} = 37.85$. The frequency response (Nyquist plots) of the open-loop systems for the system tuned with specification on gain margin 1 and for the system tuned with specification on gain margin 2, is presented in FIG. 6. One can see that, indeed, the gain margin is two for option "a", and the phase margin is 45° for option "b".

It was assumed above that the reference signal 1 in FIG. 3 was zero. Therefore, it can be further noted that the values of the control and the process variable should be understood as increments from the corresponding values in a steady operating point. To realize that, the system must be brought to a steady state first (by means of not optimally tuned but stable PID controller). After that the modified RFT should be carried out with increments of the control +h and −h from the value in the steady state. The amplitude of the oscillations must be measured with respect to the value of the process variable in the steady state.

Figure 7:
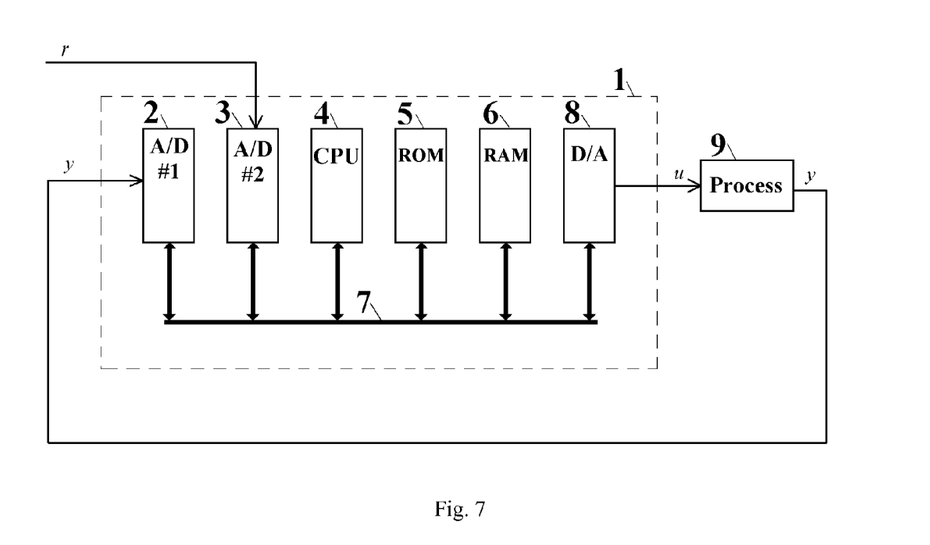
FIG. 7. Embodiment of the controller and the process.

Eventually, the designed self-tuning PID (or another type) controller is supposed to be realized as a processor based (micro-computer or controller) device and all above formulas, the nonlinear element, the tuning rules are realized as computer programs with the use of applicable programming languages. The preferred embodiment of the controller is depicted in FIG. 7. The controller 1 has two A/D converters 2 and 3 on its input for the process output and set point signals respectively (alternatively it may have only one A/D converter for the process output signal, and the set point may be realized within the controller software), a processor (CPU) 4, a read-only memory (ROM) 5 for program storage, a random access memory (RAM) 6 for buffering the data, an address/data/control bus 7 for data transfer to/from the processor, and an D/A converter 8 that converts digital control signal generated by the controller into analog format. The analog control signal is applied to the process 9 (to a control valve, etc.). All elements of the controller interact with each other in a known manner. Some elements of the controller listed above (for example A/D and D/A converters) may be missing as well as the controller may also contain elements other than listed above-depending on specific requirements and features of the control system.

We claim:
1. A method of tuning a proportional-integral-derivative controller, further referred to as a PID controller, having a transfer function

$$W_c(s) = K_c\left(1 + \frac{1}{T_{ic}s} + T_{dc}s\right),$$

where s is a Laplace variable and $K_c$, $T_{ic}$, and $T_{dc}$ are tuning parameters, for a process in a feedback control system comprising the steps of:
(a) selection of a desired gain margin $\gamma_m$ of the system for tuning for a gain margin specification or desired phase margin $\phi_m$, of the system for tuning for a phase margin specification;
(b) determining the values of the parameters $c_1$, $c_2$, and $c_3$ that define optimal tuning rules of the PID controller from the desired gain margin $\gamma_m$ of the system for tuning for a gain margin specification or the desired phase margin $\phi_m$ of the system for tuning for a phase margin specification selected at the previous step;
(c) bringing the control system into symmetric self-excited oscillations of a frequency at which a phase response of the process is equal to the desired value equal to $\psi - 180°$, where $-90° < \psi < 90°$;
(d) measurement of a frequency of the oscillations $\Omega_0$, and an amplitude of the oscillations $\alpha_0$;
(e) calculation of the tuning parameters of the PID controller in dependence on the measurements obtained at the previous step.

2. The method as recited in claim 1, wherein said parameters $c_1$, $c_2$, and $c_3$ that define the tuning rules are selected from the following table for tuning for the gain margin specification $\gamma_m = 2$ for a proportional, proportional-integral, and PID controllers, respectively,

| Controller | $c_1$ | $c_2$ | $c_3$ |
|---|---|---|---|
| Proportional | 0.50 | 0 | 0 |
| Proportional-integral | 0.49 | 0.80 | 0 |
| PID | 0.46 | 0.50 | 0.12 |

3. The method as recited in claim 1, wherein said parameters $c_1$, $c_2$, and $c_3$ that define the tuning rules are selected from the following table for tuning for the phase margin specification $\Phi_m = 45°$ for a proportional, proportional-integral, and PID controller, respectively,

| Controller | $c_1$ | $c_2$ | $c_3$ |
|---|---|---|---|
| Proportional | 1.0 | 0 | 0 |
| Proportional-integral | 0.98 | 0.80 | 0 |
| PID | 0.92 | 0.50 | 0.12 |

4. The method as recited in claim 1, wherein said parameters $c_2$, and $c_3$ that define the tuning rules are selected from the table for a proportional-integral and PID controller, respectively,

| Controller | $c_2$ | $c_3$ |
|---|---|---|
| Proportional-integral | 0.80 | 0 |
| PID | 0.50 | 0.12 | plus or minus 20% and parameter $c_1$ is calculated for tuning for a gain margin specification as follows:

$$c_1 = \frac{1}{\gamma_m \sqrt{1 + \left(2\pi c_3 - \frac{1}{2\pi c_2}\right)^2}}.$$

5. The method as recited in claim 1, wherein said parameters $c_2$, and $c_3$ that define the tuning rules are selected from the table for a proportional-integral and PID controller, respectively,

| Controller | $c_2$ | $c_3$ |
|---|---|---|
| Proportional-integral | 0.80 | 0 |
| PID | 0.50 | 0.12 | plus or minus 20%, and parameter $c_1$ is calculated for tuning for a phase margin specification as follows:

$$c_1 = \frac{1}{\sqrt{1 + \left(2\pi c_3 - \frac{1}{2\pi c_2}\right)^2}}.$$

6. The method as recited in claim 1, wherein said bringing the control system into symmetric self-excited oscillations is done via the introduction into the system the following control algorithm further referred to as modified relay feedback test with parameter $\beta$, in series with the process, so that the error signal $\sigma$ is the difference between the set point and the process control variable, the error signal is an input to the modified relay feedback test, and the output u of the modified relay feedback test is an input to the process:

$$u(t) = \begin{cases} h & \text{if } \sigma(t) \geq \Delta_1 \text{ or } (\sigma(t) > -\Delta_2 \text{ and } u(t-) = h) \\ -h & \text{if } \sigma(t) \leq \Delta_2 \text{ or } (\sigma(t) < \Delta_1 \text{ and } u(t-) = -h) \end{cases}$$

where t is current time, $\Delta_1 = \beta\sigma_{max}$, $\Delta_2 = -\beta\sigma_{min}$, $\sigma_{max}$ and $\sigma_{min}$ are last singular points of the error signal $\sigma(t)$ corresponding to the last maximum and minimum values of $\sigma(t)$, respectively, after crossing the zero level, h is the control amplitude, u(t-) is the output of the modified relay feedback test at time immediately preceding current time, and parameter $\beta$ of the modified relay feedback test is computed as $\beta = \sin\psi$, $\psi$ is a parameter.

7. The method as recited in claim 6, wherein said parameter $\psi$ is calculated as follows:

$$\psi = -\arctg\left(2\pi c_3 - \frac{1}{2\pi c_2}\right)$$

for tuning for the gain margin specification.

8. The method as recited in claim 6, wherein said parameter $\psi$ is calculated as follows:

$$\psi = \phi_m + \arctg\left(\frac{1}{2\pi c_2} - 2\pi c_3\right)$$

for tuning for the phase margin specification.

9. The method as recited in claim 6, wherein said tuning parameters are calculated as follows:

$$K_c = c_1 \frac{4h}{\pi a_0},$$

$$T_{ic} = c_2 \frac{2\pi}{\Omega_0},$$

$$T_{dc} = c_3 \frac{2\pi}{\Omega_0}.$$

10. The method as recited in claim 6, wherein said output of the modified relay feedback test and the process control variable are increments from the corresponding values in a steady operating point to which in a preferred embodiment the control system is brought by means of not optimally tuned but stable PID controller.

* * * * *